United States Patent
Wescott

[19]

[11] Patent Number: 6,123,090

[45] Date of Patent: Sep. 26, 2000

[54] AIR CONDITIONER CONDENSATION DISPERSEMENT APPARATUS

[76] Inventor: Daniel T. Wescott, 210 W. Oxford St., Vineland, N.J. 08360

[21] Appl. No.: 09/040,289

[22] Filed: Mar. 17, 1998

[51] Int. Cl.$^7$ ................................................. E04H 15/06
[52] U.S. Cl. ...................... 135/88.1; 135/96; 135/120.1; 52/16; 52/302.1; 296/163; 239/121; 239/208; 137/312; 160/45
[58] Field of Search ............................... 135/88.1, 120.1, 135/96; 296/163, 164; 160/66, 67, 45; 239/120, 121, 208, 209; 137/577, 590, 312; 222/108; 52/12, 15, 16, 74, 302.1; 165/70, 71

[56] References Cited

U.S. PATENT DOCUMENTS

| | | |
|---|---|---|
| 542,072 | 7/1895 | Whittemore . |
| 703,245 | 6/1902 | Faulkner . |
| 874,246 | 12/1907 | Rose . |
| 2,457,763 | 12/1948 | Wiggins . |
| 2,540,411 | 2/1951 | Wright . |
| 2,807,368 | 9/1957 | Blau ........................................ 52/12 X |
| 2,988,226 | 6/1961 | Campbell ................................ 52/12 X |
| 3,096,781 | 7/1963 | Roidt . |
| 3,232,489 | 2/1966 | Buffington .............................. 222/108 |
| 3,263,389 | 8/1966 | Heirich ................................... 52/16 X |
| 3,327,724 | 6/1967 | Nielsen . |
| 3,481,632 | 12/1969 | Suess ................................. 52/302.1 X |
| 3,595,269 | 7/1971 | Yeagle .................................... 137/577 |
| 3,826,271 | 7/1974 | Sattler . |
| 4,160,458 | 7/1979 | Marcellus .............................. 160/67 X |
| 4,431,382 | 2/1984 | Edman et al. ...................... 239/121 X |
| 4,492,491 | 1/1985 | Lundedn et al. ........................ 52/12 X |
| 4,633,899 | 1/1987 | Lord .................................... 137/312 X |
| 4,659,251 | 4/1987 | Petter et al. ......................... 137/312 X |
| 4,782,667 | 11/1988 | Kito et al. ............................ 222/108 X |
| 5,172,718 | 12/1992 | Thornburgh ............................ 137/312 |
| 5,341,760 | 8/1994 | Summers ............................ 135/88.1 X |
| 5,454,960 | 10/1995 | Newsome ................................. 137/312 |
| 5,492,250 | 2/1996 | Sardynski ................................ 222/108 |
| 5,842,308 | 12/1998 | Turner .................................... 52/16 X |

FOREIGN PATENT DOCUMENTS

| | | |
|---|---|---|
| 0108927 | 8/1979 | Japan ........................................ 52/16 |
| 294365 | 7/1928 | United Kingdom . |
| 1018978 | 2/1966 | United Kingdom . |

OTHER PUBLICATIONS

Camping World—Catalogue, 1997; pp. 5&6.

*Primary Examiner*—Robert Canfield
*Attorney, Agent, or Firm*—Orrick, Herrington & Sutcliffe LLP

[57] ABSTRACT

An apparatus is provided for transporting water from an awning on a recreational vehicle to a location remote from a door on the vehicle. The awning comprises a frame mounted to the vehicle and a tarp mounted to the frame. The tarp extends downward away from the recreational vehicle and defines a channel remote from the recreational vehicle which is tilted to a first side and has a first outlet at the first side. A catch basin is composed of a water-impervious material and has a side wall, a bottom panel secured to the side wall in water-tight engagement, a top opening defined by the side wall and a cavity disposed within the side wall and above the bottom panel. A bottom opening is disposed in the bottom panel. A tube has a first tube end, a second tube end and an internal chamber. The first tube end is secured in water-tight engagement to the bottom panel at the bottom opening such that the cavity is contiguous with the internal chamber. The second tube end is positioned remote to the door. A means is provided for securing the catch basin to the awning such that the top opening is disposed proximate to and below the first outlet.

20 Claims, 8 Drawing Sheets

AIR CONDITIONER CONDENSATION DISPERSEMENT APPARATUS

FIELD OF THE INVENTION

The instant invention is directed to the field of recreational vehicles. In particular, the invention is directed to an apparatus for directing the flow of condensation from a roof mounted air conditioner away from the door of the vehicle.

BACKGROUND OF THE INVENTION

Recreational vehicles, motor homes and the like have become increasingly popular over the last several years. They are designed to permit family and friends to travel to a remote location, either for camping or other recreation activities. Once there, rather than obtain a hotel room, the family can simply live out of the vehicle.

It is common to provide recreational vehicles with conveniences which would be found in a typical home. Stoves, washrooms and beds have been standard for a very long time. Air conditioning systems have been included more recently. Typically, these air conditioners are mounted at the roof of the recreational vehicle, delivering cool air to the living space.

Unfortunately, the compressors used in air conditioners create a condensate of water which drips off the air conditioning unit. This condensate can drip along the roof and then down the side of the vehicle, thus creating streaks. Alternatively, an awning can be mounted to the side of the recreational vehicle. The awning directs the flow of the condensate toward one of its corners. This corner is typically located on the same side as the door to the recreational vehicle. When the vehicle is parked in a single spot for an extended period of time, a large puddle can form. This puddle can be very messy, resulting in tracking mud and water into the vehicle. Further, the puddle is a temptation to small children, encouraging them to play with the muddy water with all its attendant health risks. There is a need to direct the flow of condensate away from the recreational vehicle such that a large puddle is not created on the side of the vehicle near the door.

Other devices have been developed to direct the flow of fluids, such as rain, off of roofs. None of these address the problems resolved by the instant invention. U.K. Patent 294,365 issued on Jul. 26, 1928 and is directed to improvements in awnings, ground coverings and the like. This patent includes a hole positioned in an awning near the bottom or outer edge. A waterproof collar is positioned about the hole. A hose is attached to the hole. Water runs down the awning, passes through the hole, and is directed to the hose.

U.S. Pat. No. 3,327,724 issued on Jun. 27, 1967 and is directed to a retractable protective covering. As shown in the drawings, the covering can be an awning. Slots are positioned in the awning near the lower edge. Gussets attached to the underside of the awning direct water passing through the slot.

U.K. Patent 1,018,978 issued on Feb. 2, 1966 and is directed to improvements in or relating to awning, tents and like structures. The awning has an arch shape with a low mid-point. A hose can be attached to the mid-point to direct water off the awning.

U.S. Pat. No. 703,248 issued on Jun. 24, 1902 for a shelter tent half and poncho. A catch basin is positioned along the edge of the tent. An outlet, which can be a water cap, is located at one end of the catch basin to permit run off of any captured water.

SUMMARY OF INVENTION

It is an object of an aspect of the present invention to provide an apparatus which can be readily attached to a recreational vehicle for directing air conditioner condensate away from the door of vehicle.

It is a further object of an aspect of the invention to provide an apparatus for directing condensate which can be easily detached for storage when not in use.

It is an object of another aspect of the invention to provide a water removal apparatus which permits a user to direct the flow of condensation as he desires.

It is an object of another aspect of the invention to provide a water removal apparatus which is designed to prevent clogging of the apparatus with debris.

It is another object of an aspect of the invention to provide a condensate removal apparatus which is both effective and inexpensive to manufacture.

It is an object of another aspect of the invention to provide a condensate removal apparatus which can be employed with existing recreational vehicles without substantial retrofitting expenses.

In accord with one aspect of this invention, an apparatus is provided for directing the flow of air conditioner condensation away from the door of a recreational vehicle. A recreational vehicle has a first side end, a second side end, front side end and a rear side end. A door is positioned along the first side end. An awning is mounted to the first side end. A front upper truss member is mounted to the first side end of the recreational vehicle near the front end and extends outward and downward from the first side end. A front lower trust member is mounted to the first side end of the recreational vehicle near the front end and below the front upper truss member and extends outward and upward from the first side end. The front upper truss member and the front lower truss member are connected distal to the first side end at a left junction. A rear upper truss member is mounted to the first side end of the recreational vehicle near the rear end and extends outward and downward from the first side member. A rear lower truss member is mounted to the first side end of the recreational vehicle near the rear end and below the right upper truss member and extends outward and upward from the first side member. The rear upper truss member and the rear lower truss member are connected distal to the first side end at a right junction. A beam extends in a substantially horizontal direction parallel to the first side end from the rear junction to the front junction. A tarp has a substantially rectangular shape with a left longitudinal edge extending proximate to the rear upper truss member, a right longitudinal edge extending proximate to the front rear upper truss member, an upper lateral edge extending from the rear longitudinal edge to the front longitudinal side proximate to the first side end of the recreational vehicle, and a lower lateral side extending from the left longitudinal side to the right longitudinal side distal to the first side end of the recreational vehicle. The lower lateral side is lower than the upper lateral side. A channel is formed by the tarp and has a rear end and a front end. The channel extends along the lower lateral side from the right longitudinal edge to the left longitudinal edge. The rear junction is lower than the front junction such that condensation traveling along the tarp is directed to the channel and then to the rear end of the channel by gravity. A container is formed of a waterimpermeable material and has a side wall, a bottom panel, a top opening defined by the side wall, a cavity within the side wall and a bottom opening positioned in the bottom panel. The cavity is adapted to direct condensation from the top opening to the bottom opening. A belt is selectively attached to the container at attachment points near the top opening and extends over the beam proximate to the rear junction such that the top opening of the container is disposed below the rear end of the channel. A tube is attached to the bottom panel of the container at the bottom opening such that condensation directed to the bottom opening proceeds into the tube. The tube extends to at least the first side end.

Certain implementations of this aspect of the invention provide that: an external nipple is mounted to the bottom panel of the container at the bottom opening exterior to the container, wherein the tube is selectively attached to the external nipple; an internal nipple is mounted to the bottom panel at the bottom opening and extends into the cavity above the bottom panel; a screen is mounted to the internal nipple; a screen is removably mounted to the container at the top opening; the tube extends a fixed distance into the cavity, thereby defining a lower chamber; the bottom panel has a curved shape; the tube is a flexible material selectively attached to the bottom panel and the tube is wound around the rear lower truss member and extends to at least the second side of the recreational vehicle; an ornamental design is mounted on the side wall of the container; a fitting is selectively mounted to the bottom panel at the bottom opening and includes means for receiving the tube in secured engagement; and the attachment points are knobs mounted on the wall of the container and the belt further comprising loops sized to fit over the knobs.

In accord with another aspect of the invention, an apparatus is provided for dispersing condensation from a roof-mounted air conditioner on a recreational vehicle to a point remote from a door of the vehicle. The vehicle includes a first side end, a door mounted to the first side end, a roof, and an air conditioning unit mounted to the roof. A frame is mounted to the first side end and includes at least a beam extending in a substantially horizontal direction distal to the first side end. The beam has a first tip and a second tip, wherein the first tip is lower than the second tip. A tarp is mounted to the frame and extends from proximate to the first side end downward to the beam. The tarp is disposed above the door near the first side end and is composed of a substantially water-tight material. A channel is formed by the tarp extending along the beam such that the channel is positioned between the beam and the recreational vehicle. A catch basin is releasably secured to the beam near the first tip. The catch basin includes a side wall, a bottom plate secured to the sidewall in water-tight engagement, a top opening defined by the side wall, a cavity within the side wall and a bottom opening disposed in the bottom plate. A narrow tube is attached to the bottom plate with an interior chamber that is contiguous to the cavity. The narrow tube extends to a position remote from the door.

Certain implementations of this aspect of the invention provide that: a flap is attached to the tarp and extends over the beam for a selected flap height, wherein the distance between the bottom panel and the beam is about the same as the flap height; the channel has a channel depth less than one inch and the narrow tube has an interior chamber with a diameter less than 0.30 inches; the narrow tube extends from the bottom opening and is attached to the frame; a rim has a ring-shaped cross section which is selectively seated in the top opening and engaged to the side wall and a screen is mounted within the rim; an external nipple is mounted to the bottom panel of the catch basin at the bottom opening exterior to the cavity, wherein the narrow tube is selectively attached to the external nipple; and an internal nipple is mounted to the bottom panel at the bottom opening and extends into the cavity above the bottom panel.

In accord with another aspect of this invention, an apparatus is provided for transporting water from an awning on a recreational vehicle to a location remote from a door on the vehicle. The awning comprises a frame mounted to the vehicle and a tarp mounted to the frame. The tarp extends downward away from the recreational vehicle and defines a channel remote from the recreational vehicle which is tilted to a first side and has a first outlet at the first side. A catch basin is composed of a water-impervious material and has a side wall, a bottom panel secured to the side wall in water-tight engagement, a top opening defined by the side wall, and a cavity disposed within the side wall and above the bottom panel. A bottom opening is disposed in the bottom panel. A tube has a first tube end, a second tube end and an internal chamber. The first tube end is secured in water-tight engagement to the bottom panel at the bottom opening such that the cavity is contiguous with the internal chamber. The second tube end is positioned remote to the door. A means is provided for securing the catch basin to the awning such that the top opening is disposed proximate to and below the first outlet.

Certain implementations of this aspect of the invention provide that: the securing means comprises a belt secured to the side wall near the top opening and forming an arch, wherein the arch surrounds at least a portion of the frame near the first side of the channel and maintains the catch basin in close proximity to and below the first outlet of the channel; the securing means comprises a T-hook attached to the catch basin near the top opening and disposed in a slit in a beam of the frame; a fitting is selectively engaged to the bottom panel in the bottom opening, the fitting including an external nipple positioned exterior to the container, wherein the first tube end is selectively attached to the external nipple, and an internal nipple mounted to the bottom panel at the bottom opening and extending into the cavity above the bottom panel.

DESCRIPTION OF PREFERRED EMBODIMENTS

Figure 1:
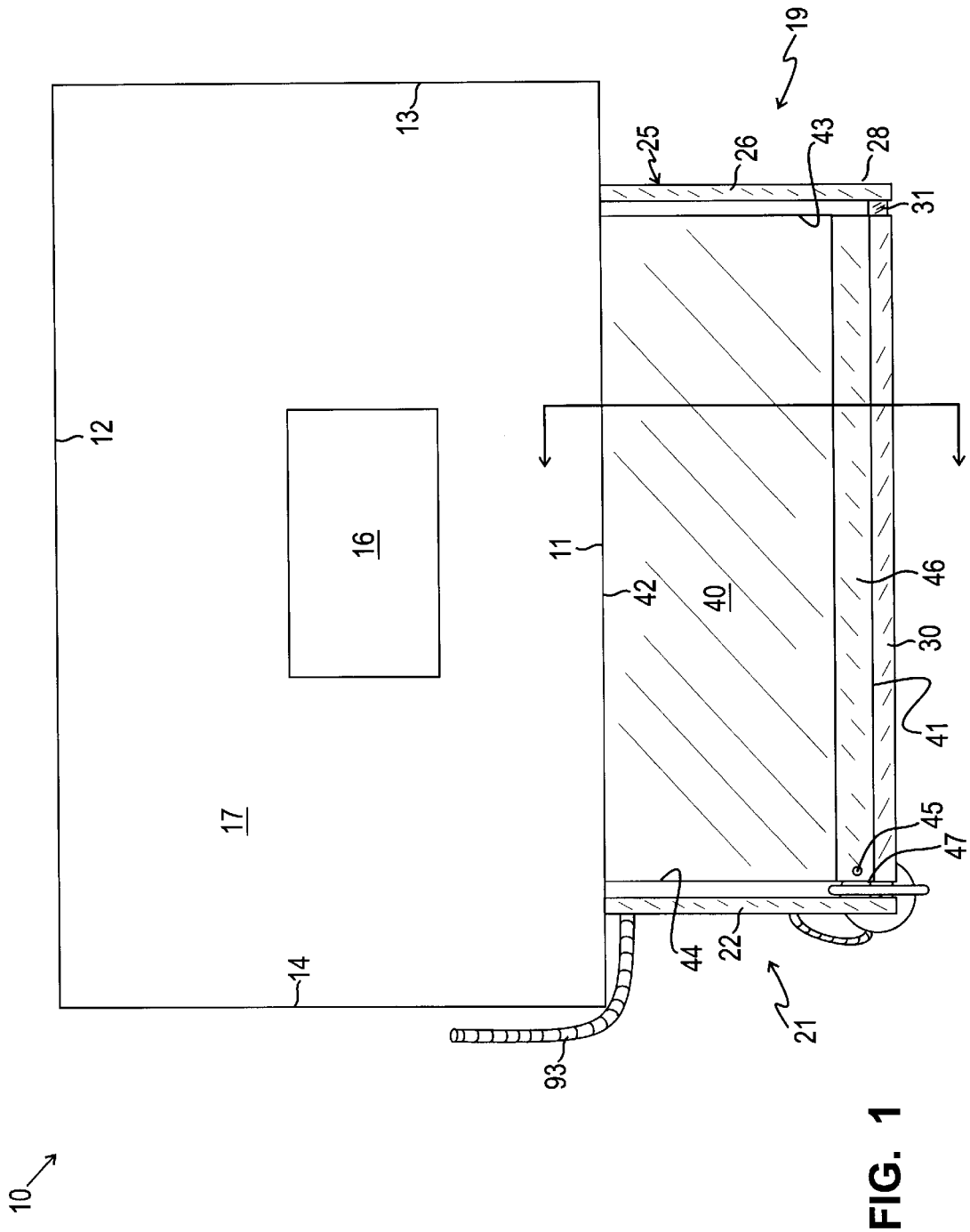
FIG. 1 is a top elevation view of a condensation removal apparatus in accord with the instant invention mounted to a recreational vehicle.
Figure 2:
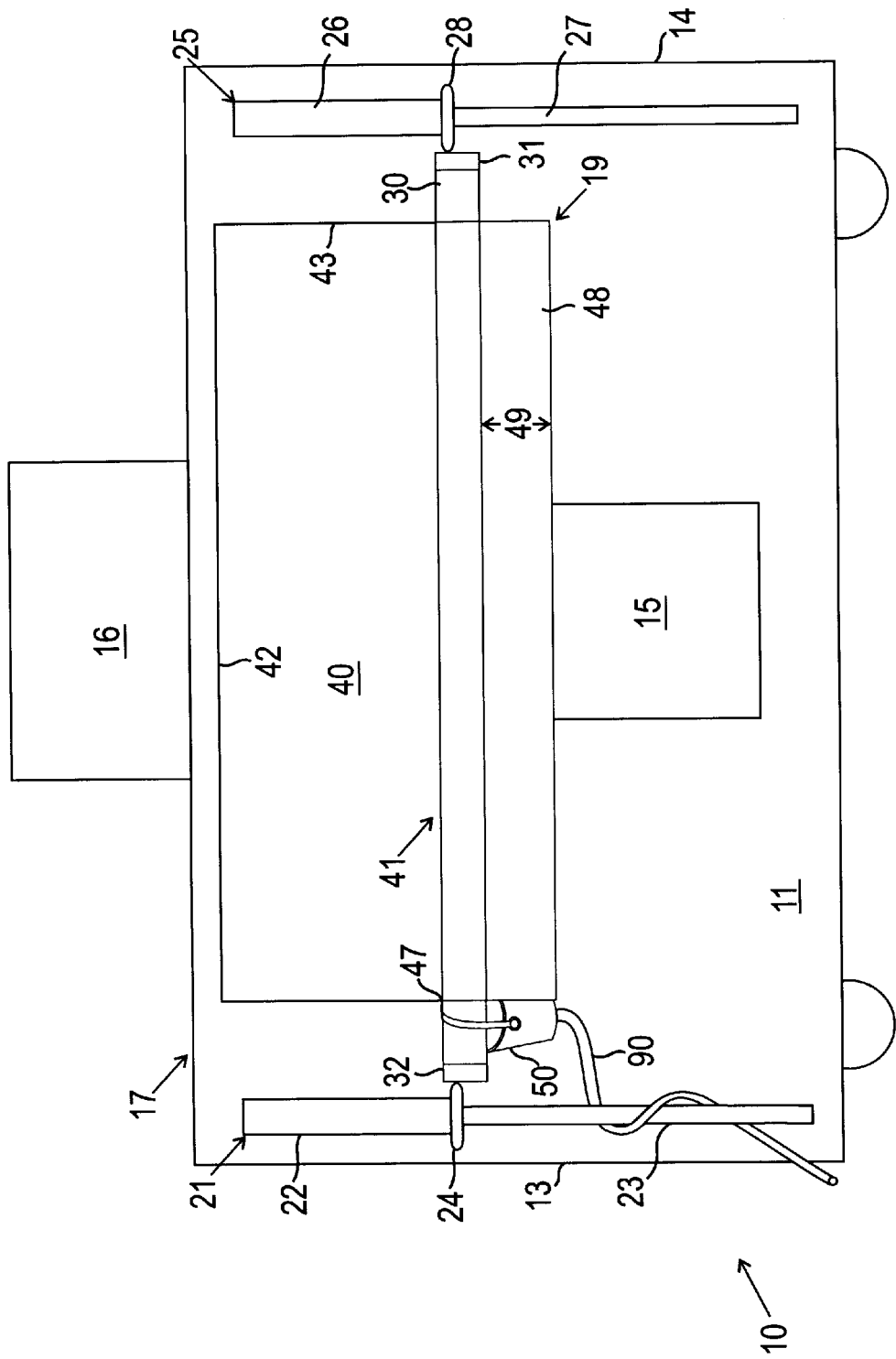
FIG. 2 is a side elevation view of the apparatus of FIG. 1.
Figure 3:
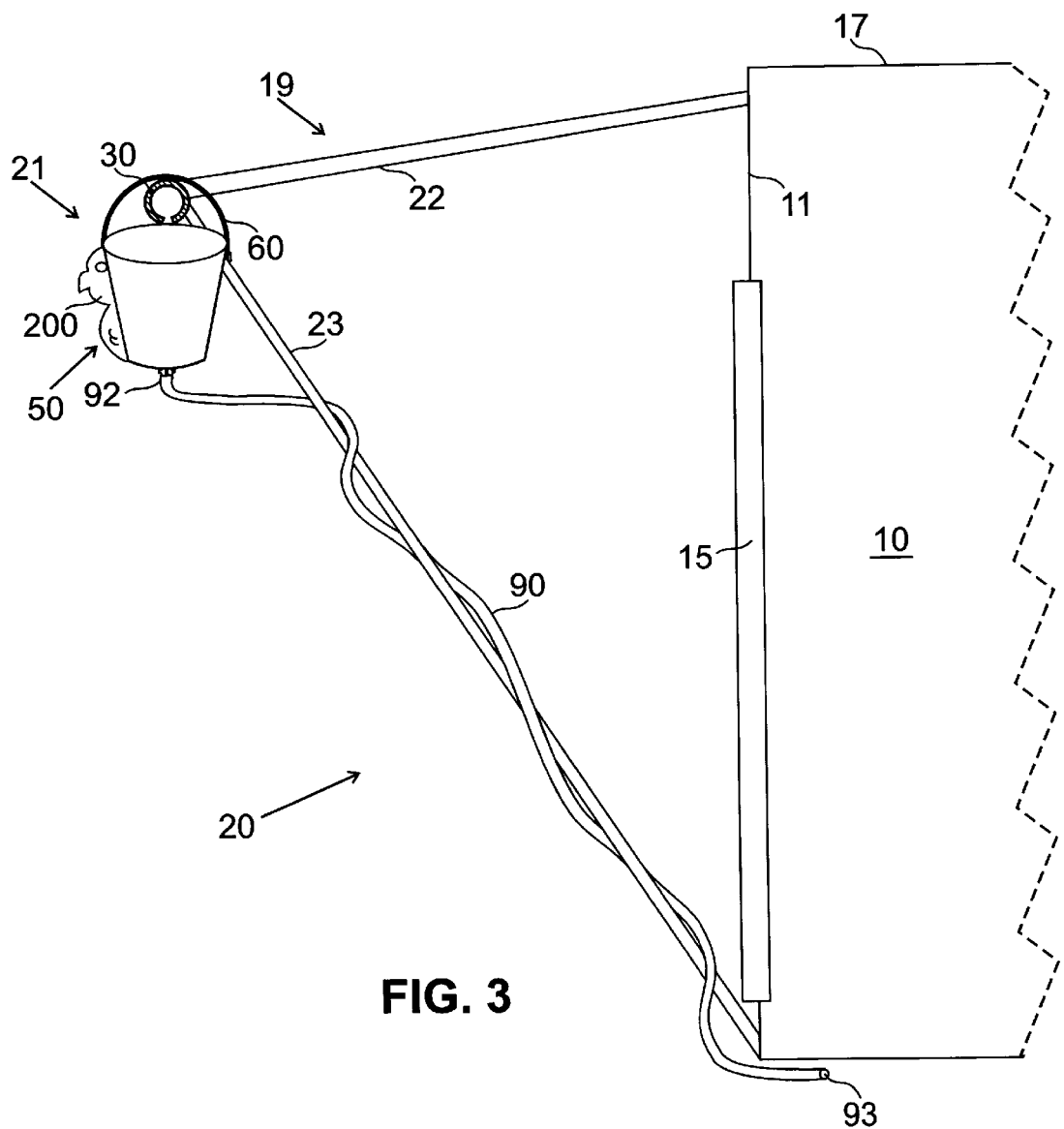
FIG. 3 is a side view of the apparatus of FIG. 1 along line III—III with the tarp removed for clarity.

Referring to FIGS. 1–3, a typical recreational vehicle 10 has a substantially rectangular shape with a first side end 11, a second side end 12, a front end 14 and a rear side end 13. A door 15 is located along the first side end. An air conditioning unit 16 is mounted to the roof 17 of the recreational vehicle. The roof is generally slanted to direct the flow of water, such as the air conditioner condensate, at least partly toward the first side end.

An awning 19 is attached to the first side end 11 of the recreational vehicle 10 near the roof 17, slanting down and away. The awning includes a frame 20 having trusses 25, 21 mounted near the front and the rear of the first side end. Each truss includes an upper truss member 26, 22 and a lower truss member 27, 23. The upper and lower truss members are pivotally connected at junctions 28, 24 (see also FIG. 5). A beam 30 extends from the junction 28 at the front truss 25 to the junction 24 at the rear truss 21. The beam includes a front tip 31 and a rear tip 32 attached to the front junction and the rear junction, respectively. A tarp 40 is mounted to the top of the frame.

Figure 4:
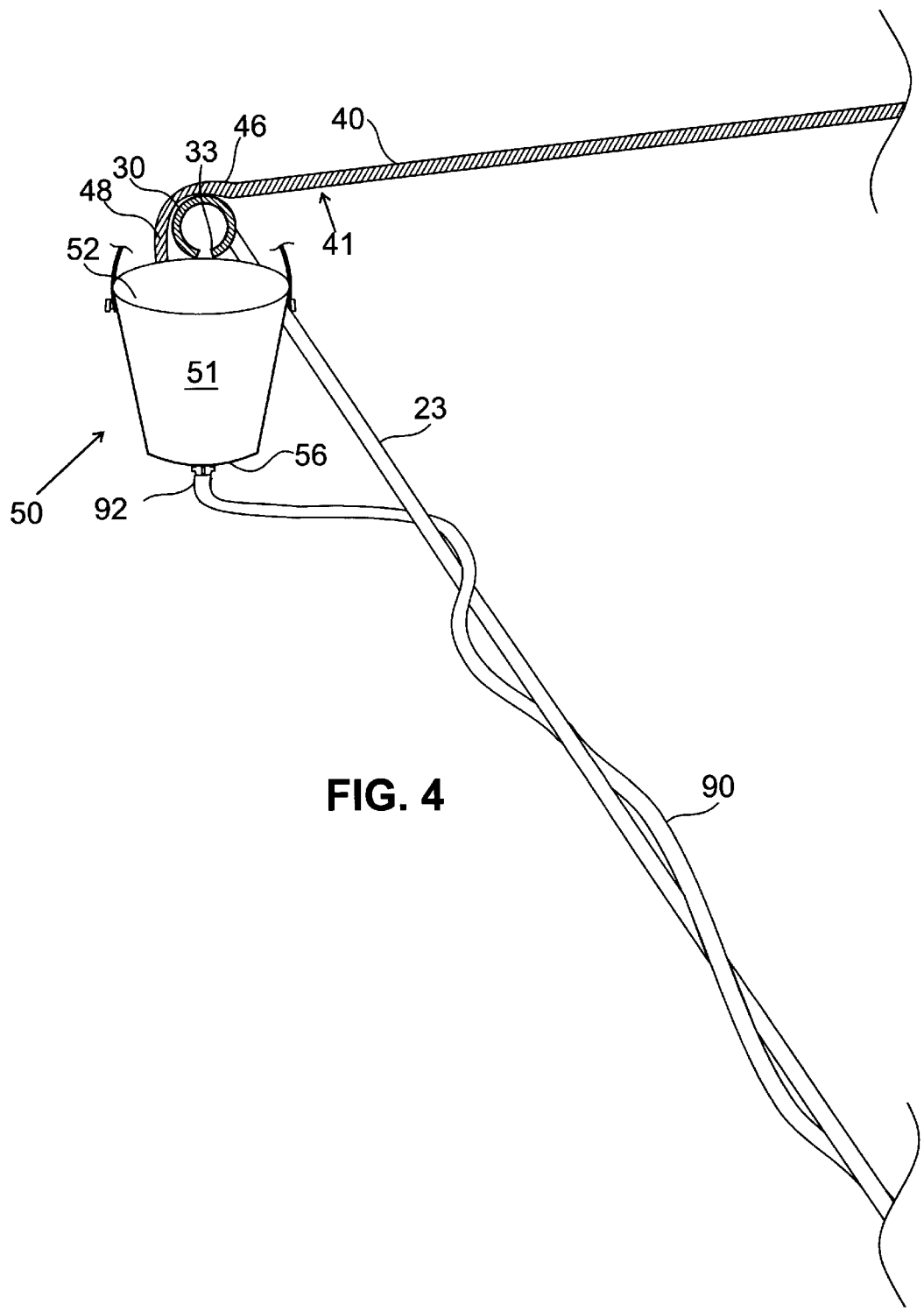
FIG. 4 is a side view of the apparatus of FIG. 1 along line III—III with the upper truss member removed for clarity.

Referring to FIGS. 1, 2 and 4, the tarp 40 has a rectangular shape with a front longitudinal edge 43 extending proximate to the upper front truss member 26. Similarly, the tarp has a rear longitudinal edge 44 extending proximate to the upper rear truss member 22. An upper lateral edge 42 of the tarp extends along proximate to the first side end 11 of the recreational vehicle 10. This upper lateral edge is disposed above the top of the door 15. A lower lateral edge 41 extends along the beam 30 and is disposed at a lower height than the upper lateral edge 42. Preferably, a flap 48 is integrally formed or sewn along the lower lateral edge of the tarp and extends over the beam and downward a fixed distance, that is, the flap height 49 (see FIGS. 2 and 5). The flap can be scalloped or provided with other decorative features, as one skilled in the art would appreciate.

The tarp 40 is sized slightly larger than the frame 20 in the longitudinal direction such that a slight channel 46 is formed by the tarp at the lower lateral edge 41 along the beam 30 (see FIGS. 1 and 4). Typically, a seam and bead are formed at the lower lateral edge which engages the beam and the seam effectively creates the tunnel. Preferably, the channel is of a limited depth, such as less than one inch, so that it does not extend too low and create a hazard for the heads of passers-by. The channel should not extend below the flap 48. Preferably, the tarp 40 is made of an opaque, water-proof material such that any fluids, such as rain or the air conditioner condensate, will flow over the surface of the tarp from the upper lateral edge 42 downward toward the lower lateral edge 41 and into the channel 46. The front truss 25 is preferably slightly higher than the rear truss 21 so that the beam 30 is tilted downward toward the rear. As a result, the channel 46 also tilts toward the rear. Any water entering the channel is thus directed toward the lowest corner 45 of the tarp by gravity. Since no side walls are provided (or needed) on the channel, this water then flows out of the channel from an outlet 47 toward the ground. As a result, a large puddle can form directly beneath the outlet 47 and the corner 45.

The beam 30 is preferably a hollow cylinder having a slit 33 running from the front tip 31 to the rear tip 32. The beam can be rotated, rolling up the tarp 40, as one skilled in the art would appreciate. It will also be appreciated that other such structures can be employed to support the tarp and still practice the invention.

Figure 6:
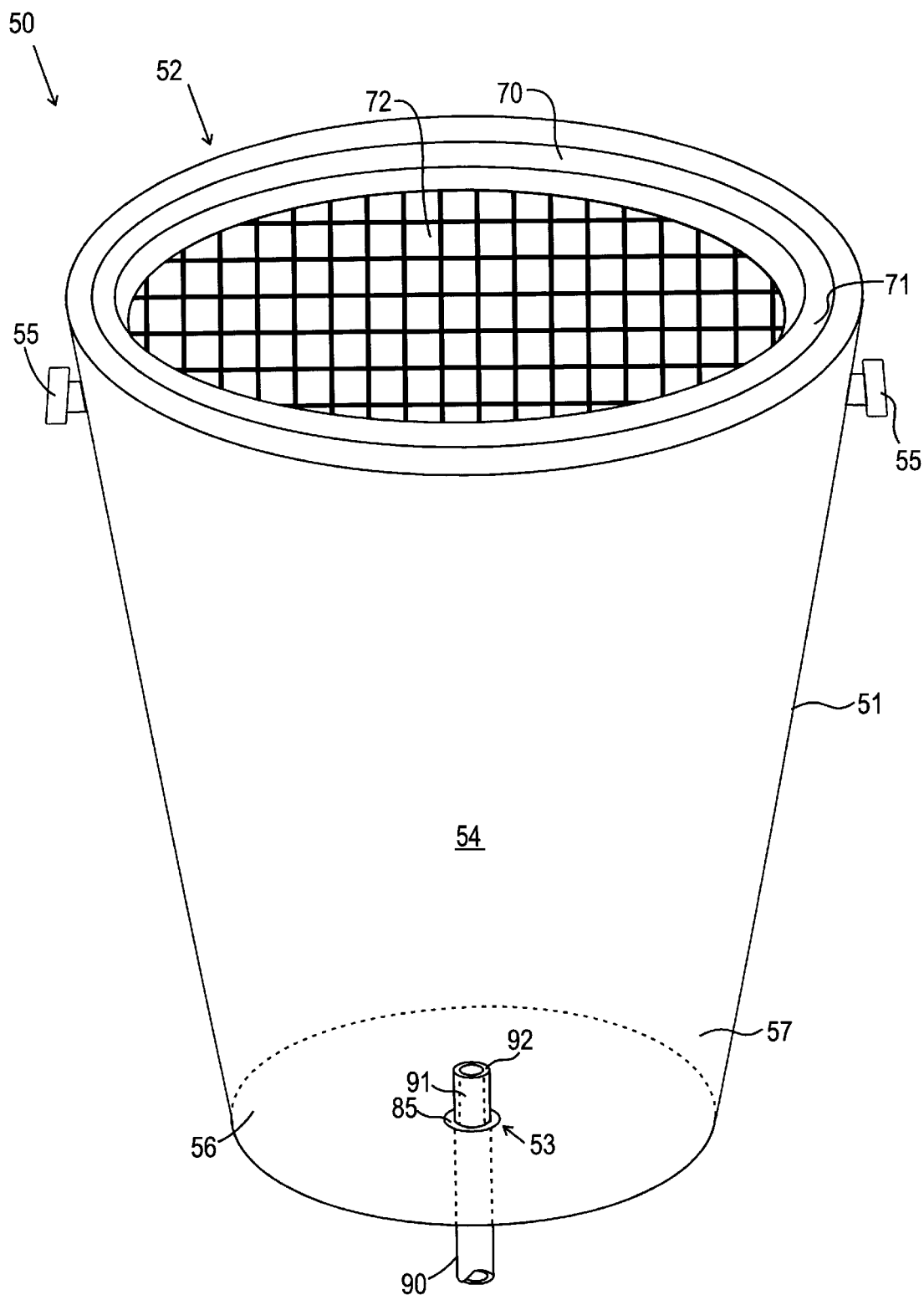
FIG. 6 is a front perspective view of the apparatus of FIG. 1.
Figure 7:
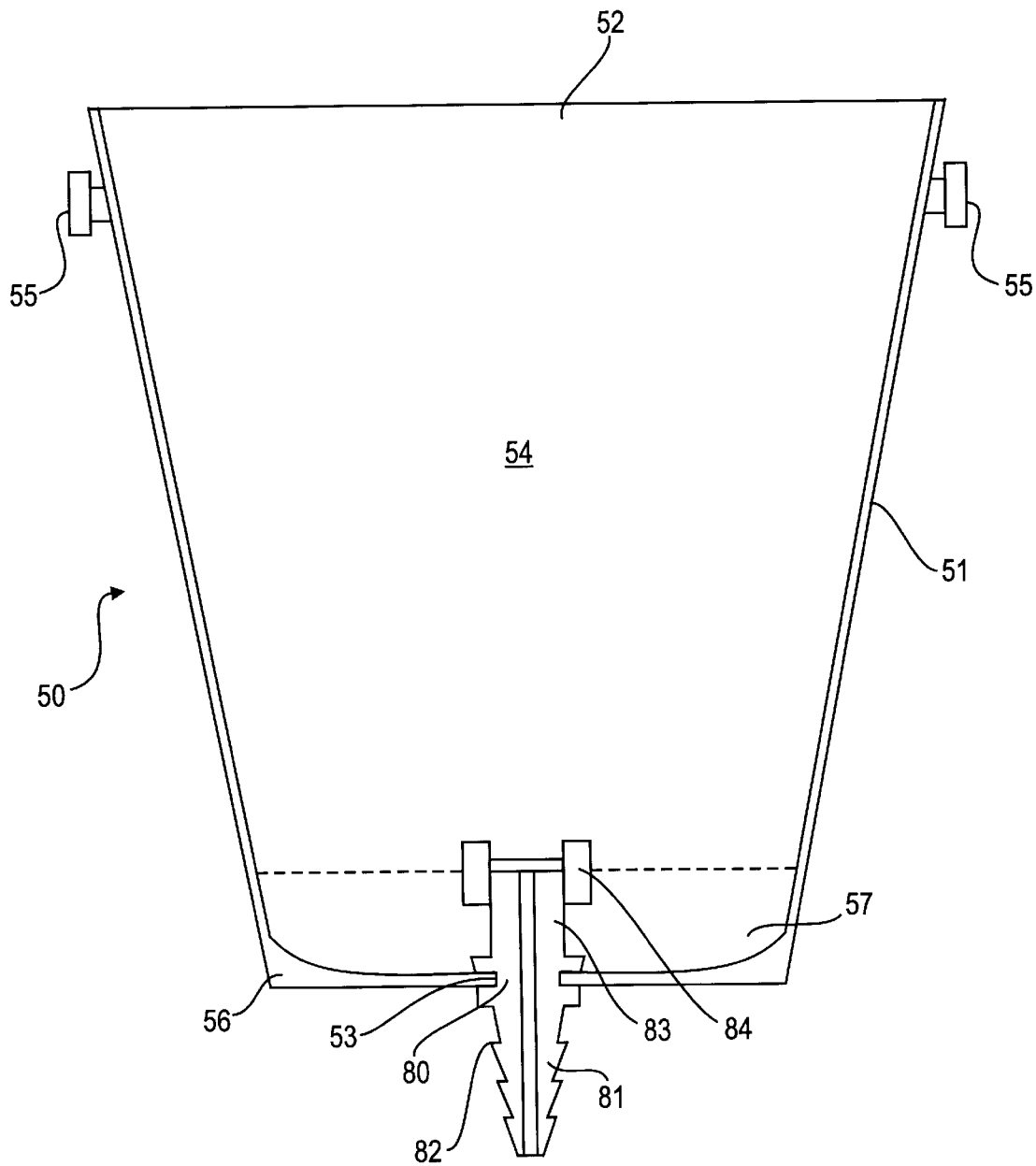
FIG. 7 is a side cut-away view of the apparatus of FIG. 1 with a nipple fitting.

Referring to FIGS. 2–5, a container or catch basin 50 has a side wall 51 which is integrally formed with a bottom panel 56. A top opening 52 is defined at the top of the side wall. Referring to FIGS. 6 and 7 as well, a bottom opening 53 is positioned at the center of the bottom panel. A cavity 54 is defined by the side wall above the bottom panel. The catch basin is designed such that liquid entering the top opening is directed through the cavity to the bottom opening. As currently preferred, the side wall has a funnel-shape and the bottom panel is a flat, circular plate. It will be understood that the side wall and bottom panel can have different shapes and still practice the invention. In particular, the side wall could be cylindrical. Further, the bottom panel could be curved, convex down, such that the bottom opening is at a relative low point (see FIG. 7). This will help direct fluid flow on the bottom panel toward the bottom opening.

Figure 5:
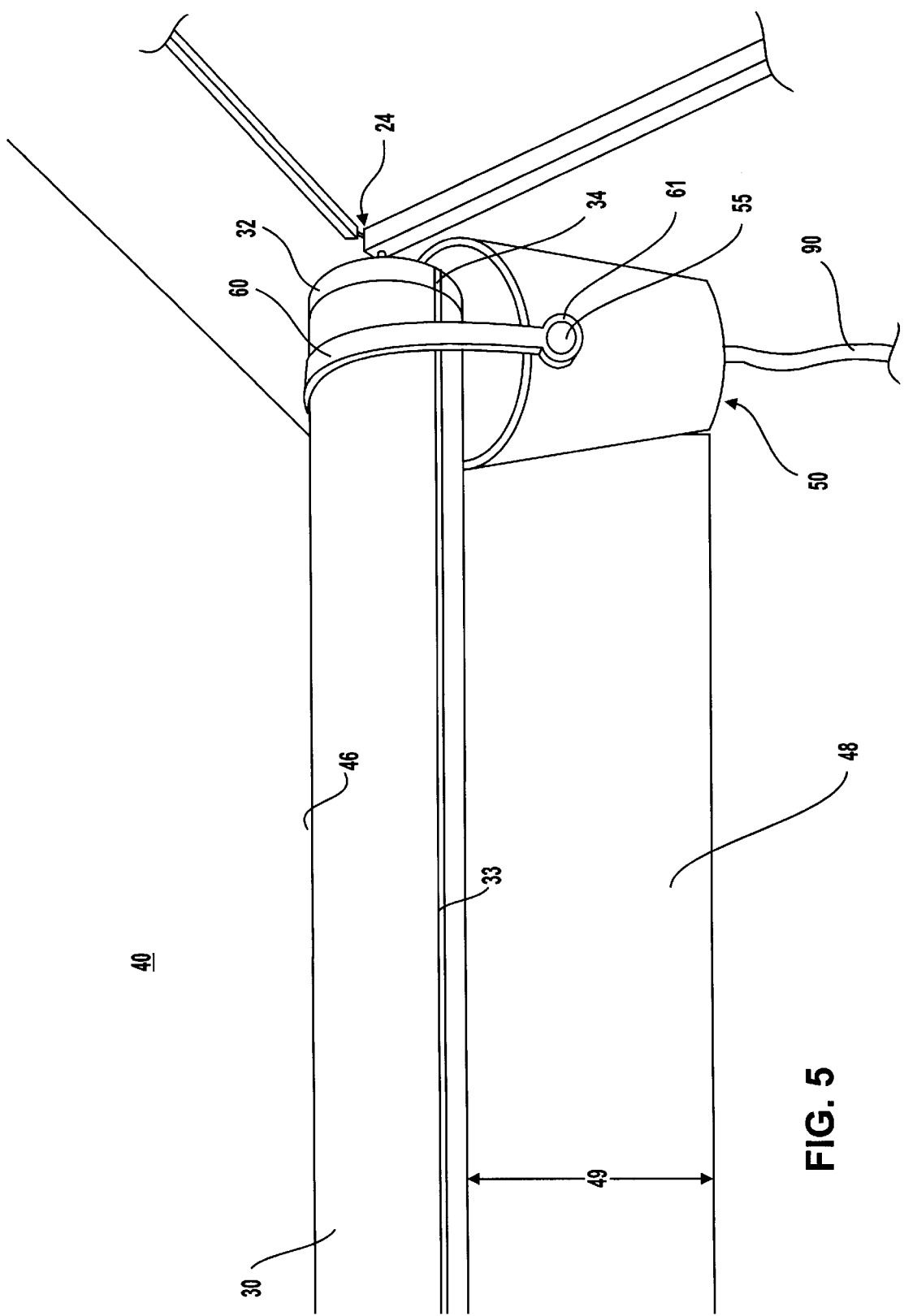
FIG. 5 is a perspective view of the condensation removal apparatus of FIG. 1.

As seen in FIGS. 2 and 5, the catch basin 50 is attached to the frame 20 proximate to the rear lower corner, i.e., the lowest corner 45 on the tarp 40. A belt 60 includes loops 61 at its ends. Knobs 55 are mounted to or integrally formed with the side wall 51 of the catch basin near the top opening 52 but on opposite sides. The belt is preferably made of a somewhat flexible, plastic material. Further, the catch basin is also made of a somewhat flexible, plastic material.

To attach the catch basin 50 to the frame 20, the belt 60 is attached to one knob 55. The belt is then slipped over the beam 30 near the rear tip 32. The other loop is then attached to the other knob. As a result, the belt will form an arch to support the weight of the catch basin on the beam (see FIGS. 2–5). Preferably, the bottom plate does not extend substantially below the flap, as seen in FIG. 2 and 5.

Other techniques can be employed to attach the catch basin 50 to the beam. For example, a T-hook 65 can be slipped into the slit 33 in the beam 30. An opening 34 is provided at the rear tip 32 to receive the T-hook. The belt 60 can then be attached to the T-hook. Alternatively, the catch basin 50 can be attached directly to the T-hook. The T-hook can be slid along the length of the slit (and thus the beam) such that the top opening 52 of the catch basin is disposed beneath the lower rear corner 45 of the tarp 40.

A flexible narrow tube 90 is attached to the bottom panel 56 at the bottom opening 53. The tube includes an interior chamber 91 with an internal diameter of less than 0.30 inches, for example, 0.25 inches. The interior chamber is contiguous with the cavity 54 of the catch basin 50 (see, e.g., FIG. 6). Fluids in the cavity pass into the interior chamber and pass through the tube. As seen in FIG. 1, the tube has a sufficient length to extend to a point remote from the door 15 of the recreational vehicle 10. Preferably, the tube is wound around the lower rear truss member 23 and then extends to the rear side end 13 or the second side end 12 of the recreational vehicle (see FIGS. 2–4). Of course, Velcro® straps and the like can be used to secure the tube in place on the frame.

Referring to FIG. 6, the tube 90 can be integrally formed with or attached to the bottom panel 56. An O-ring 85 can be supplied at the junction of the tube and the bottom panel to reduce any leakage. Alternatively, an exterior nipple 81 can be attached to or integrally formed with the bottom panel and extend downward away from the catch basin 50 (see FIG. 7). Ridges 82 are supplied to the exterior of the nipple. The narrow tube 90 can be slipped over the nipple and is maintained in place by the ridges. When not in use, the tube can simply be slipped off the exterior nipple.

Figure 8:
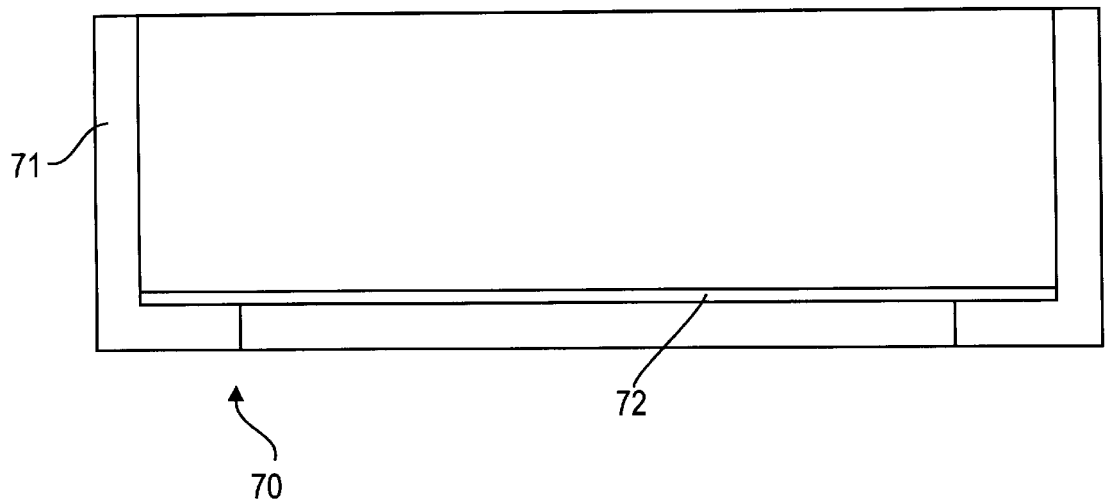
FIG. 8 is a side cut-away view of a screen cover for use with the apparatus of FIG. 1
Figure 9:
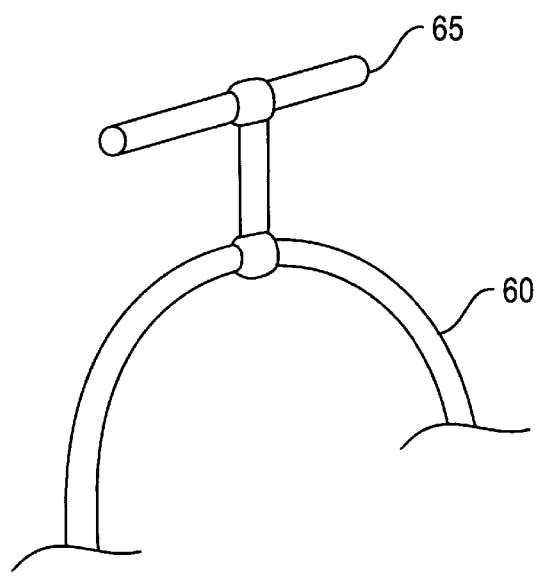
FIG. 9 is a perspective view of a T-hook for use with the apparatus of FIG. 1.

One difficulty faced when directing liquids is debris which can collect on the tarp 40. This debris can be washed with the liquids into the channel 46 and then clog the catch basin 50 or tube 90. Referring to FIGS. 6 and 8, a screen cover 70 can be supplied in a rim 71. Preferably, the rim is a flexible, elastic material which is shaped to fit snugly within the top opening 52. A screen 72 is contained within the rim and will capture the debris while allowing the water to pass into the cavity 54.

The narrow tube 90 can be extended a short portion into the cavity 54 above the bottom panel 56 as seen in FIG. 6. As a result, a lower chamber 57 is defined beneath the top inlet end 92 of the tube 90 and above the bottom panel. Debris falling into the cavity will settle to the bottom of the cavity in the lower chamber. Meanwhile, water entering the cavity will rise until it is at a level at or above the top of the tube. The water will then flow into the tube, leaving the debris in the lower chamber. Alternatively, an interior nipple 83 can be formed on the bottom panel 56 and extending upward into the cavity 54. The top of the interior nipple thus defines the lower chamber 57. In one embodiment, the exterior nipple 81 and the interior nipple 83 are integrally formed as a fitting 80. The fitting is inserted into the bottom opening 53. The interior nipple defines the lower chamber while the exterior nipple provides an easy mount for the narrow tube. A cap 84 with a screen can be fit of the interior nipple to further reduce any debris entering the narrow tube.

In operation, the catch basin 50 is attached to the beam 30 near the rear tip 32 such that the top opening 52 is directly below the outlet 47 of the channel 46, i.e., below the corner 45. Any condensate formed by the air conditioner 16 travels down the roof 17 and onto the tarp. Since the tarp is waterproof and is slanted away from the first side end 11 of the recreational vehicle 10, the condensate flows into the channel. Since the channel is tilted, the condensate flows to the outlet and into the top opening. The condensate is directed through the screen 72 such that debris is retained but the water condensate proceeds through the cavity 54 to the bottom opening 53. The condensate proceeds through the cavity 54 to the bottom opening 53. The condensate then passes into the inlet end 92 of the tube 90, through the internal chamber 91 and then out the outlet end 93. Preferably, the outlet end is remote from the first side end 11 of the recreational vehicle, such as by the rear side end 14 or the second side end 12.

While this invention has been described with reference to specific embodiments disclosed herein, it is not confined to the details set forth and the patent is intended to include modifications and changes which may come within and extend from the following claims. For example, an ornamental face plate 200 can be attached to the catch basin, as seen in FIG. 3, to improve the visual appearance of the apparatus.

What is claimed is:

1. An apparatus for directing the flow of air conditioner condensation away from the door of a recreational vehicle comprising:

a recreational vehicle having a first side end, a second side end, front side end and a rear side end, a door positioned along the first side end;

an awning mounted to the first side end and comprising:
      a front upper truss member mounted to the first side end of the recreational vehicle near the front side end and extending outward and downward from the first side end;
      a front lower trust member mounted to the first side end of the recreational vehicle near the front side end and below the front upper truss member and extending outward and upward from the first side end, wherein the front upper truss member and the front lower truss member are connected distal to the first side end a front junction;
      a rear upper truss member mounted to the first side end of the recreational vehicle near the rear side end and extending outward and downward from the first side member;
      a rear lower truss member mounted to the first side end of the recreational vehicle near the rear side end and below the rear upper truss member and extending outward and upward from the first side end, wherein the rear upper truss member and the rear lower truss member are connected distal to the first side end at a rear junction;

a beam extending in substantially horizontal direction parallel to the first side end from the rear junction to the front junction;

a tarp having a substantially rectangular shape with a left longitudinal edge extending proximate to the rear upper truss member, a right longitudinal edge extending proximate to the front upper truss member, an upper lateral edge extending from the left longitudinal edge to the right longitudinal edge proximate to the first side end of the recreational vehicle, and a lower lateral edge extending from the left longitudinal edge to the right longitudinal edge distal to the first side end of the recreational vehicle, wherein the lower lateral edge is lower than the upper lateral edge; and a channel formed by the tarp and having a rear end and a front end, the channel extending along the lower lateral edge from the right longitudinal edge to the left longitudinal edge wherein the rear junction is lower than the front junction such that condensation traveling along the tarp is directed to the channel and then to the rear end of the channel by gravity;

a container formed of water-impermeable material and having a side wall, a bottom panel connected to the side wall in water-tight engagement, a top opening defined by the side wall, a cavity within the side wall and a bottom opening positioned in the bottom panel, wherein the cavity is adapted to direct condensation from the top opening to the bottom opening;

a belt selectively attached to the container at attachment points near the top opening, the belt extending over the beam proximate to the rear junction such at the top opening of the container is disposed at least in part, below the rear end of the channel; and a tube attached to the bottom panel of the container at the bottom opening such that condensation directed to the bottom opening proceeds into the tube, the tube extending to at least the first side end.

2. The apparatus of claim 1 further comprising an external nipple mounted to the bottom panel of the container at the bottom opening exterior to the container, wherein the tube is selectively attached to the external nipple.

3. The apparatus of claim 2 further comprising an internal nipple mounted to the bottom panel at the bottom opening and extending into the cavity above the bottom panel.

4. The apparatus of claim 3 further comprising a screen mounted to the internal nipple.

5. The apparatus of claim 1 further comprising a screen removably mounted to the container at the top opening.

6. The apparatus of claim 1 wherein the tube extends a fixed distance into the cavity, thereby defining a lower chamber.

7. The apparatus of claim 1 wherein the bottom panel has a curved shape facing the cavity.

8. The apparatus of claim 1 wherein the tube is composed of a flexible material and is selectively attached to the bottom panel and the tube is wound around the rear lower truss member and extends to at least the second side of the recreational vehicle.

9. The apparatus of claim 1 further comprising an ornamental design mounted on the side wall of the container.

10. The apparatus of claim 1 further comprising a fitting selectively mounted to the bottom panel at the bottom opening and including means for receiving the tube in secured engagement.

11. The apparatus of claim 1 wherein the attachment points are knobs mounted on the wall of the container and the belt further comprising loops sized to fit over the knobs.

12. An apparatus for dispersing condensation from a roof-mounted air conditioner on a recreational vehicle to a point remote from a door of the vehicle to a point remote from a door of the vehicle, the vehicle including a first side end, a door mounted to the first side end, a roof, and an air conditioning unit mounted to the roof, the apparatus comprising:
- a frame adapted to be mounted to the first side end, which frame includes at least a beam extending in substantially horizontal direction distal to the first side end when the frame is mounted to the first side end, the beam having a first tip and a second tip, wherein the first tip is lower than the second tip;
- a tarp mounted to the frame and adapted to be from proximate to the first side end downward to the beam, wherein the tarp is adapted to be disposed above the door near the first side end when the frame is mounted to the first side end and wherein the tarp is composed of a substantially water-tight material;
- a channel formed by the tarp extending along the beam such that the channel is adapted to be positioned between the beam and the recreational vehicle when the frame is mounted to the first side;
- a catch basin releasably secured to the beam near the first tip, the catch basin including a side wall, a bottom plate secured to the side wall in water-tight engagement, a top opening defined by the side wall, a cavity within the side wall and a bottom opening disposed in the bottom plate; and
- a narrow tube attached to the bottom plate within an interior chamber that is contiguous to the cavity, the narrow tube is adapted to be extending to a position remote from the door when the frame is mounted to the first side end.

13. The apparatus of claim 12 further comprising a flap attached to the tarp and extending over the beam for a selected flap height, wherein the distance between the bottom panel and the beam is about the same as the flap height.

14. The apparatus of claim 12 wherein the channel has a channel depth less than one inch and the narrow tube has an interior chamber with a diameter less than 0.30 inches.

15. The apparatus of claim 14 wherein the narrow tube extends from the bottom opening and is attached to the frame.

16. The apparatus of claim 12 further comprising a rim having a ring-shaped cross section which is selectively seated in the top opening and engaged to the side wall and a screen mounted within the rim.

17. The apparatus of claim 12 further comprising an external nipple mounted to the bottom panel of the catch basin at the bottom opening exterior to the cavity, wherein the narrow tube is selectively attached to the external nipple.

18. The apparatus of claim 12 further comprising an internal nipple mounted to the bottom panel at the bottom opening and extending into the cavity above the bottom panel.

19. An apparatus for transporting water from an awning on a recreational vehicle to a location remote from a door on the vehicle, wherein the awning comprises a frame mounted to the vehicle, a tarp mounted to the frame and extending downward away from the recreational vehicle the tarp defining a channel remote from the recreational vehicle which is titled to a first side and has a first outlet at the first side, the apparatus comprising:
- a catch basin composed of water-impervious material and having a side wall, a bottom panel secured to the side wall in water-tight engagement, a top opening defined by the side wall, a cavity disposed within the side wall and above the bottom panel, a bottom opening disposed in the bottom panel;
- a tube with tube end, a second tube end and an internal chamber, the first tube end being secured in water-tight engagement to the bottom panel at the bottom opening such that the cavity is contiguous with the internal chamber, the second tube end being positioned remote to the door; and
- a means for securing the catch basin to the awning such that the opening is disposed proximate to and below the first outlet;
- wherein the securing means securing means comprises a T-hook attached to the catch basin near the top opening and adapted to be disposed in a slit in a beam of the frame.

20. The apparatus of claim 19 further comprising a fitting selectively engaged to the bottom panel in the bottom opening, the fitting including an external nipple positioned exterior to the container, wherein the first tube end is selectively attached to the external nipple, and an internal nipple mounted to the bottom panel at the bottom opening and extending into the cavity above the bottom panel.

* * * * *